J. A. BILTERMAN AND W. J. SMITH.
AUTOMOBILE BUMPER.
APPLICATION FILED MAR. 29, 1922.
1,435,100.
Patented Nov. 7, 1922.
2 SHEETS—SHEET 1.
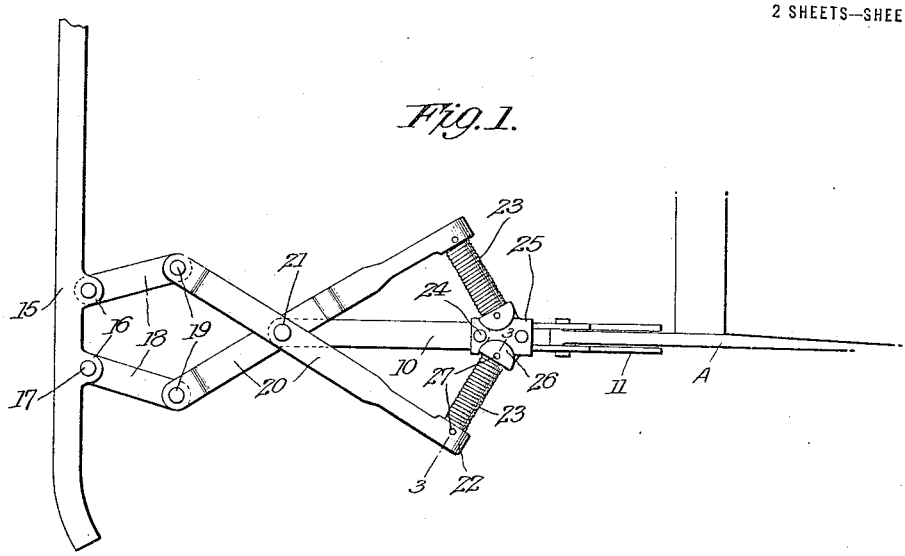
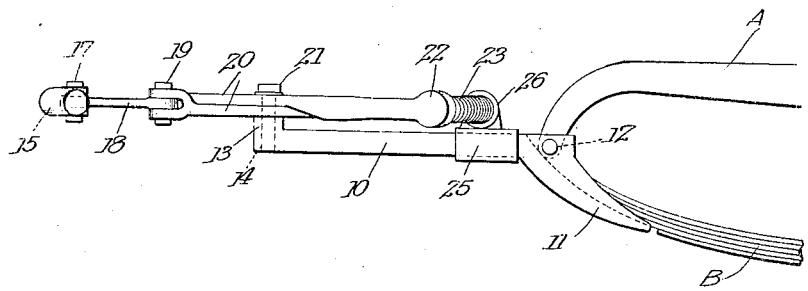
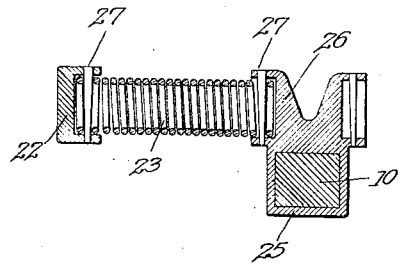
J. A. Bilterman.
W. J. Smith.
INVENTOR
BY Victor J. Evans
ATTORNEY J. A. BILTERMAN AND W. J. SMITH.
AUTOMOBILE BUMPER.
APPLICATION FILED MAR. 29, 1922.

1,435,100.

Patented Nov. 7, 1922.
2 SHEETS—SHEET 2.

J. A. Bilterman.
W. J. Smith.
INVENTOR

BY Victor J. Evans
ATTORNEY

WITNESS:

Patented Nov. 7, 1922.

1,435,100

UNITED STATES PATENT OFFICE.

JOHN A. BILTERMAN, OF ALBIA, AND WILLIS J. SMITH, OF OTTUMWA, IOWA.

AUTOMOBILE BUMPER.

Application filed March 29, 1922. Serial No. 547,785.

*To all whom it may concern:*

Be it known that we, JOHN A. BILTERMAN and WILLIS J. SMITH, citizens of the United States, respectively, residing at Albia, in the county of Monroe, and Ottumwa, in the county of Wapello, and State of Iowa, have invented new and useful Improvements in Automobile Bumpers, of which the following is a specification.

This invention relates to attachments for automobiles, particularly to bumper devices, and has for its object the provision of a novel bumper which is provided with spring means for taking up the shock of a collision, the spring means at each end of the bumper being independent whereby one end of the bumper can yield or give to a greater extent than the other, the device operating in every way to decrease the danger of injuring the automobile itself.

An important object is the provision of a bumper structure in which the spring action is directed laterally against a link and lever system whereby to absorb or take away the end thrust upon the vehicle itself and prevent injury to any of the parts in case of a collision.

Still another object is the provision of a bumper structure of this character in which the springs may be either of the compression or tension type depending upon the exact arrangement and association of the links and lever element.

Another object is the provision of a bumper which is provided with means of various types whereby it may be secured upon the springs or forward ends of the frame bars of an automobile chassis in a simple and convenient manner, the securing means being susceptible of variations whereby the device may be used to equal advantage upon automobiles of different makes or types.

An additional object is the provision of a device of this character which will be simple and inexpensive in manufacture and installation, highly efficient in use, positive in action, durable in service and a general improvement in the art.

With the above and other objects and advantages in view, the invention consists in the details of construction to be hereinafter more fully described and claimed, and illustrated in the accompanying drawings in which, Figure 1 is a plan view of the bumper structure mounted in position, Figure 2 is a side elevation thereof illustrating one form of attaching means, Figure 3 is a detail sectional view taken on the line 3—3 of Figure 1.

Figure 4:
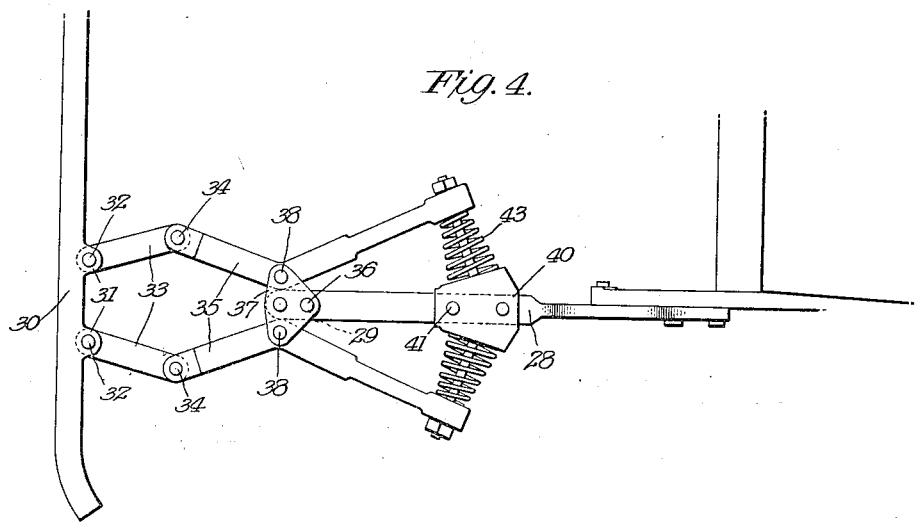
Figure 4 is a plan view of another form of the device.

Referring more particularly to the drawings and especially to Figures 1 to 3 inclusive, the numeral 10 designates an elongated arm which has one end curved as indicated at 11 for substantially conforming engagement against the front spring of the vehicle and which is provided with a hole 12 for the passage of the bolts which connect the forward end of the spring with the forward end of the frame bar A of the vehicle. The spring is designated by the letter B. At its other end this arm 10 is formed with a slight upward extension 13 through which is formed a vertical hole 14. The numeral 15 designates the bumper bar which may be of rigid or flexible material as preferred and which may be formed either tubular or solid likewise as may be found advisable. Near each end this bar 15 is formed with rearward extension 16 with which are pivotally connected, as shown at 17, rearwardly extending somewhat diverging links 18 which have their rear ends pivotally connected as shown at 19, with the forward ends of a pair of levers 20 which are arranged in cross-relation as shown and pivoted upon the forward extremity of the arm 10 by means of a suitable bolt 21 which passes through the levers and through the hole 14 in the forward end of the arm 10. The rear ends of these levers 20 are formed with sockets 22 within which are engaged the outer ends of coil springs 23 of the tension type. Secured upon the arm 10 as by means of suitable bolts 24, is a sleeve 25 which is formed at opposite sides with sockets 26 within which are engaged the other ends of the spring. The end portions of the springs are held associated with the sockets 22 and 26 by means of suitable transverse pins 27. The structure at both ends of the bumper bar is the same, that is to say there are two of the arms 10, one for each side of the vehicle frame and two sets for the lever and spring devices illustrated.

Assuming that the bumper has been constructed and installed as above described, it will be apparent that whenever a blow is struck upon the bumper bar 15, as for instance in the event of a collison, there will be a tendency of the rear end of the lever 20 to spread apart and owing to the provision of the spring 23 it will be readily apparent that this tendency will be strongly opposed and yet in a resilient manner which will operate to cushion or absorb the shock of the collision and consequently prevent damage to any of the parts of the spring absorbing device for the automobile itself.

Figure 5:
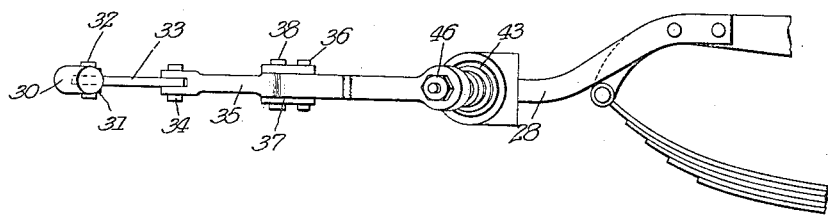
Figure 5 is a side elevation thereof showing a different attaching means.
Figure 6:
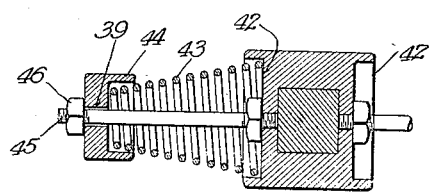
Figure 6 is a cross-sectional view on the line 6—6 of Figure 4.

In Figures 4 to 6 inclusive we have illustrated a different form of spring tension device.

Referring to this form the numeral 28 designates a supporting arm which is designed to be secured to the front spring or forward end of the frame bar of the automobile in exactly the same manner as the arm 10 if preferred though in actual practice this arm 28 is illustrated as being of slightly different form whereby it may be secured to the forward end of the frame bars of different types of automobiles. Regardless of this fact however the forward end the arm 28 is provided with a pair of spaced vertical holes 29. The numeral 30 designates the bumper bar which is the same in construction as that previously described and which is formed near either end with a pair of lugs or projections 31 with which are pivotally connected, as shown at 32, rearwardly extending and somewhat diverging links 33 which have their rear ends pivotally connected as shown at 34 with the forward ends of angularly shaped levers 35. Secured upon the forward extremity of the arm 28, by means of bolts 36 passing through the holes 29, is a bracket structure 37 with which the angular levers 35 are pivotally connected as shown at 38. The levers 35 are arranged in cross relation as are the levers 20 of the previously described form but have their rear ends diverging as clearly indicated and formed with slots 39.

Secured upon the intermediate portion of the arm 28 is a bracket structure 40 held in place by means of suitable bolts 41 passing therethrough and through the arm 28 and this bracket structure is provided at opposite sides of the arm 28 with recesses 42 within which are normally disposed the inner ends of conical shaped spring 43 which have their outer ends engaged within sockets 44 leading into or communicating with slots 39 at the outer ends of the angular levers 35. Associated with the rear ends of the angular levers 35 are rods 45 which have their ends carrying nuts 46 engaging against the outer surfaces of the levers at the rear ends thereof and which have their other ends secured at opposite sides of the bracket member 40, these rods passing through the slots 39 in the levers.

In the operation of this form of the device it will be seen that when a blow is struck upon the bumper bar 30, as for instance in the case of a collision, the movement will be imparted to the link 33 and subsequently to the angular levers 35. The effect of the blow or shock is to move the rear ends of the angular levers toward the arm 28 and this will of course result in compression of the springs 43 so that they will operate to cushion or absorb the shock and prevent injury to the mechanism or damage to the automobile itself. It will be observed that by adjusting the nuts 46 the initial tension of the springs 43 may be varied so that they will be more or less sensitive depending upon what is desired and the type of automobile with which the device is associated.

From the foregoing description and a study of the drawings it will be apparent that we have thus provided a simply constructed and consequently inexpensive bumper structure which may be readily installed upon automobiles of various makes, the shape of the attaching arm being of course susceptible of variation depending upon the specific bar with which the device is to be used. It is also to be noted that owing to the peculiar construction both ends of the bumper bar are independently supported so that in case something strikes against the bumper bar there will be a natural tendency to cause it to slip over to one side. Owing to the simplicity of the construction and the fewness of the parts it is apparent that there is practically nothing to get out of order and that the device should consequently have a long life and satisfactorily perform all the functions for which it is intended.

While we have shown and described the preferred embodiment of the invention and have illustrated certain attaching arms by means of which the device may be mounted upon automobiles of different makes, it is of course to be understood that we reserve the right to make such changes in the form, construction and arrangement of parts as will not depart from the spirit of the invention or the scope of the subjoined claims.

Having thus described the invention we claim:

1. A bumper device for automobiles comprising a pair of supporting arms secured to the forward ends of the frame bars of the automobile, a pair of levers pivoted upon each arm, coiled springs associated with said arm and with said levers whereby to oppose movement of the latter, and a bumper bar connected with the forward ends of the levers.

2. A bumper device for automobiles comprising supporting arms adapted for connection with the forward end of the automobile chassis, a pair of levers pivoted upon the forward portion of each arm, spring members connected with the arm and with the rear end of said levers whereby to oppose movement of the latter, links pivotally connected with the forward ends of the levers, and a bumper bar having a pivotal connection with said links.

3. A bumper device for automobiles comprising a pair of forwardly extending arms secured upon the forward portion of the chassis of the automobile, a pair of levers pivoted upon the forward end of each arm and arranged in cross-relation, links pivotally connected with the forward ends of said levers, a bumper bar pivotally connected with the forward ends of said links, and tension springs connected with the arm and with the rear ends of said levers.

4. A bumper device for automobiles comprising a pair of forwardly extending arms having their rear end formed for connection with the forward end of the chassis of the automobile, a pair of levers pivoted in cross-relation upon the forward end of each arm, links pivotally connected with the forward end of said levers, a bumper bar having a pivotal connection with the forward ends of the links, the rear ends of said levers being formed with sockets, a bracket member secured upon the rear portion of the arm and formed at opposite sides with sockets, and tension springs having their inner and outer ends engaged within the sockets in said brackets and the rear ends of the levers respectively, and securing members holding the ends of said springs in position.

5. A bumper device for automobiles comprising a pair of forwardly extending arms adapted for connection with the forward end of the chassis of an automobile, a pair of angularly shaped levers pivoted upon the free end of each arm, a pair of links connected with the forward end of said levers, a bumper bar having a pivotal connection with the forward end of said links, a bracket member secured upon the rear portion of each arm, and a pair of compression springs located between the rear ends of said levers and said bracket member.

6. A bumper device for automobiles comprising a pair of forwardly extending arms adapted for connection with the forward end of the chassis of an automobile, a pair of angularly shaped levers pivoted upon the free end of each arm, a pair of links connected with the forward end of said levers, a bumper bar having a pivotal connection with the forward end of said links, a bracket member secured upon the rear portion of each arm, and a pair of compression springs located between the rear ends of said levers and said bracket member, and guide rods associated with and extending to said springs and having their inner ends secured to the bracket and having their outer ends passing slidably through the rear ends of the levers.

In testimony whereof we affix our signatures.

JOHN A. BILTERMAN.
WILLIS J. SMITH.